W. T. SMITH.
SPINDLE AND FLIER FOR SPINNING AND DOUBLING MACHINES.
APPLICATION FILED MAR. 13, 1911.
1,086,233.
Patented Feb. 3, 1914.
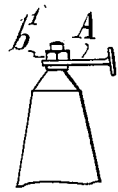 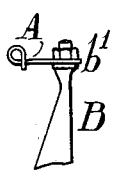 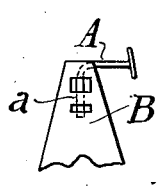 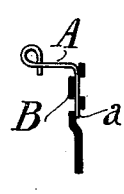
Fig. 6.  Fig. 7.  Fig. 8.  Fig. 9.
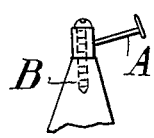 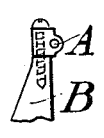  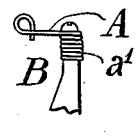
Fig. 10.  Fig. 11.  Fig. 12.  Fig. 13.
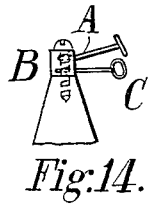
Fig. 14.
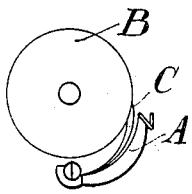 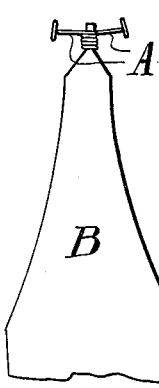 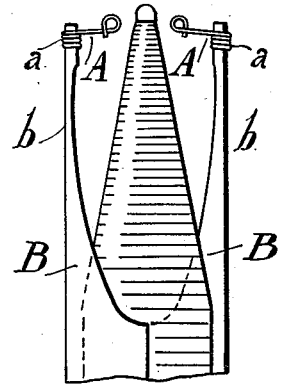
Fig. 15.  Fig. 4.  Fig. 3.
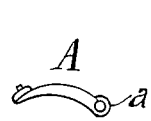 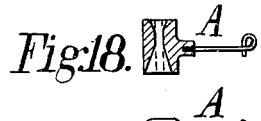 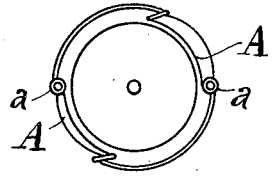
Fig. 2.  Fig. 18. Fig. 19.  Fig. 5.
Fig. 1.  Fig. 20. Fig. 21.
 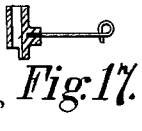 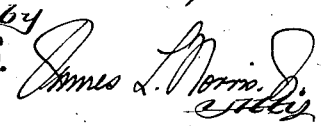
WITNESSES
Fig. 17.
INVENTOR
William T. Smith
by
James L. Morris
Atty
Fig. 16.

UNITED STATES PATENT OFFICE.

WILLIAM T. SMITH, OF BOLTON, ENGLAND.

SPINDLE AND FLIER FOR SPINNING AND DOUBLING MACHINES.

1,086,233.   Specification of Letters Patent.   Patented Feb. 3, 1914.

Application filed March 13, 1911. Serial No. 614,163.

*To all whom it may concern:*

Be it known that I, WILLIAM THOMAS SMITH, a British subject, residing at Bolton, county of Lancaster, England, have invented certain new and useful Improvements in Spindles and Fliers for Spinning and Doubling Machines, of which the following is a specification.

This invention relates to fliers by which the yarn or thread is wound onto spindles in cop form or with a tapering nose.

In such fliers it has been customary to make a guide eye or curl to direct the thread onto the cop and it has also been proposed to place such eye at the end of a presser which has a horizontal movement to and from the spindle.

The object of this invention is to provide a flexible thread guide mounted on the flier which will be capable of a movement in the direction of the longitudinal axis of the cop spindle and more or less parallel thereto for the purpose of equalizing or regulating the strain or tension of the yarn set up by the irregularities or want of synchronizing in the speed of the cop spindle, the lift of the cop rail, and the delivery of the yarn from the rollers, as the yarn is being wound onto the ever varying diameters of the cop nose.

The invention will be fully described with reference to the accompanying drawings forming part of the specification.

Figure 1, is a side elevation of the flexible thread guide. Fig. 2 is a plan view thereof, Fig. 3, is an elevation of the flexible guide affixed to the flier, Fig. 4 is a view similar to Fig. 3 but taken at right angles thereto. Fig. 5 is a plan view of Figs. 3 and 4, Figs. 6 to 9, are views showing other methods of attaching flexible guides to the flier, Figs. 10 to 13, are views showing two forms of flexible thread guides which are capable also of radial movement. Figs. 14 and 15, are, respectively, an elevation and a plan view showing another modification of flexible thread guide. Figs. 16 and 17 are, respectively, a side elevation and a sectional view of a modification of a swiveled flexible thread guide. Figs. 18 and 19, are, respectively, a sectional view and a plan view of a vertically swiveled thread guide. Figs. 20 and 21 are, respectively, a sectional view and a plan view of another arrangement of vertical swiveled thread guide.

The thread guide A shown in Figs. 1 to 9 is made from hard steel or other wire of small diameter and is flattened to give flexibility in the vertical direction and add to the rigidity in the horizontal direction, or it may be made from a metallic ribbon, spring steel or other suitable material. The thread guide A is preferably attached to the flier B in a horizontal plane and somewhat tangential (or extending laterally around the cop) to give it sufficient length for the desired flexibility, (see Fig. 5). If found more convenient the thread guide A may be placed at any inclination to the horizontal. The flexible thread guide A may be attached to the flier B by twisting one end $a$ of the wire of the thread guide into a coil and screwing it onto a screw thread cut in a projection $b$ of the flier B (see Figs. 1 to 5).

Figs. 6 and 7 show another method of attaching the thread guide A to the flier, the end of the guide being looped or flattened to receive a screw and being secured by a nut $b'$.

Figs. 8 and 9 show a further method of attaching the thread guide A to the flier, the end $a$ of the thread guide being bent at right angles and passed through slots in the flier sides. Any other convenient means may be employed for attaching the thread guide to the flier.

Figs. 10 and 11 show a modification in which the flexible thread guide A besides being flexible in a vertical plane also has a radial movement from its center on the flier leg B and is weighted to act, under the influence of the centripetal force, also as a presser on the cop.

Figs. 12 and 13 show another modification in which the flexible thread guide A also acts as a presser on the cop. The end $a'$ of the thread guide A is in the form of a spring mounted on the flier leg B, thus causing the thread guide to be pressed onto the cop.

Figs. 14 and 15 show a modification in which a separate presser C is employed, the flexible thread guide A being rigidly mounted on the presser so that it moves radially with it and always remains about one-sixteenth of an inch from the cop. By this means the flexible thread guide is very free to move up and down under the influence of the pull of the yarn only.

Figs. 16 and 17 show a modification in which the flexible thread guide A also acts as a presser on the cop. The flexible guide A is mounted to swivel horizontally on the flier and is prevented from swinging or projecting outward beyond the flier by a stop $a^2$ which will only allow movement inside the circumference of the flier. The stop $a^2$ is a cut away portion of the bearing or a pin inserted in a slot. With this form of bearing balance weights may be dispensed with.

Figs. 18 to 21 show a modification in which the flexible thread guide A is mounted on a pivot on the flier B so as to give the up and down movement by means of a double coned or tapering bearing. In Figs. 18 and 19 the pivot is cylindrical and the interior of the bearing of the guide A is coned or tapered to swivel up and down thereon. In Figs. 20 and 21 the pivot is coned or tapered and the interior of the bearing of the guide A is cylindrical to swivel up and down on the coned pivot.

The action of the flexible thread guide A is such that when the tension on the yarn increases it is raised—relatively to the flier—and the yarn is guided onto a smaller diameter of the cop nose, thereby reducing the strain or tension on the yarn, less yarn being wound on the cop nose per revolution of the spindle; and vice versa, when the tension on the yarn is too small ballooning will result. The flexible guide then springs back again and guides the yarn onto a larger diameter of the cop nose, thus automatically taking up the slack or correcting the winding diameters or irregularities or want of harmony which may exist between the speed of winding and the delivery of the rollers which, without this flexible thread guide, must be in absolute unison, since any deviation would result in straining and breaking of the yarn from over-winding, or ballooning from too slow or under-winding of the yarn on the cop nose and spindle.

What I claim as my invention and desire to protect by Letters Patent is:—

1. The combination, with a heavy, rigid flier; of a horizontally-disposed thread guide flexibly affixed to the upper rigid end of the flier for rotation therewith and having a terminal eye which is movable up and down relatively to the rigid flier structure as the tension of the yarn increases and decreases during its winding into a cop and without affecting the stability of the flier, substantially as described.

2. The combination, with a heavy, rigid flier, of a horizontally-disposed thread guide flexibly affixed to the upper end of the flier for rotation therewith and having a terminal eye, said eye being movable up and down relatively to the flier as the tension of the yarn or thread increases and decreases during its winding into a cop, and a presser by which the guide eye is maintained at a uniform distance from the cop, substantially as described.

In testimony whereof I have hereunto affixed my signature in presence of two witnesses.

WILLIAM T. SMITH.

Witnesses:
I. OWDEN O'BRIEN,
HARRY BARNFATHER.

---

Copies of this patent may be obtained for five cents each, by addressing the "Commissioner of Patents, Washington, D. C."